April 28, 1953
S. D. GUNNING
2,636,254
METHOD OF MAKING A RIGID CONNECTION
BETWEEN A SLEEVE AND A BUSHING
Filed May 19, 1948
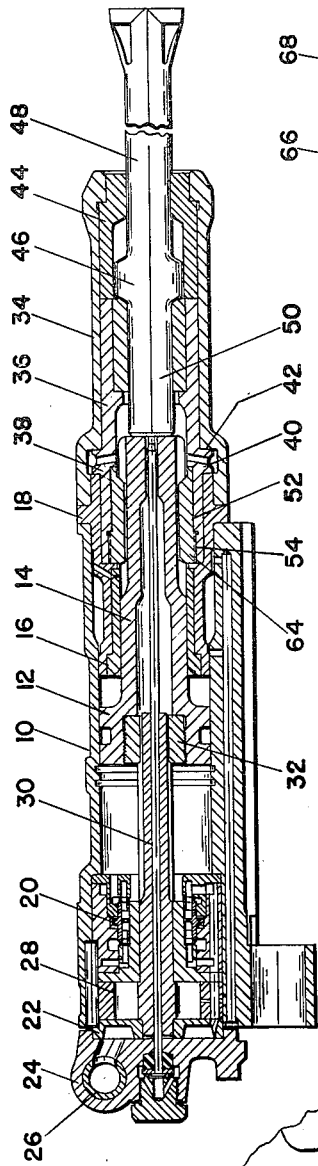
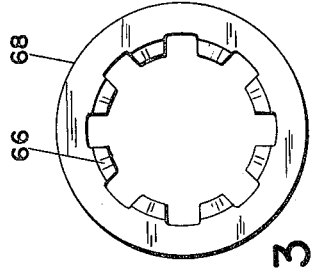
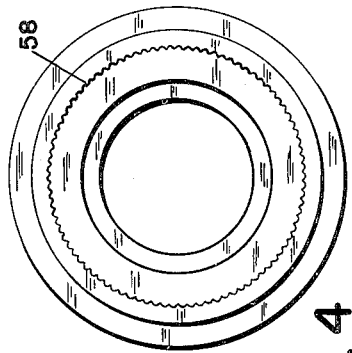
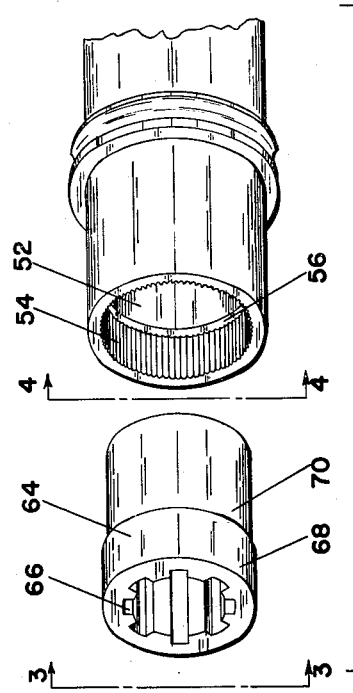
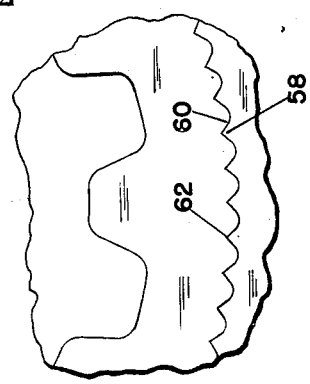
INVENTOR.
SAMUEL D. GUNNING
BY
ATTORNEY

UNITED STATES PATENT OFFICE 2,636,254

METHOD OF MAKING A RIGID CONNECTION BETWEEN A SLEEVE AND A BUSHING

Samuel D. Gunning, Cleveland Heights, Ohio, assignor to Le Roi Company, Milwaukee, Wis., a corporation of Wisconsin Application May 19, 1948, Serial No. 28,037

2 Claims. (Cl. 29—148.2)

This invention pertains broadly to the front or chuck end construction of fluid actuated rock drills of the hammer type, but more particularly to the method of making a rigid connection between a sleeve and a bushing which will prevent relative rotation therebetween.

In rock drills wherein rotation is imparted to the drill steel from the reciprocating hammer or piston, it is the common practice to provide a chuck assembly rotatably mounted within the front housing of the drill, which assembly generally consists of a chuck driver adapted to receive the shank of the drill steel, a sleeve which extends from the driver to the stem of the reciprocating piston and a nut carried by the sleeve in operative engagement with the piston. The chuck driver is appropriately shaped to fit over the shank of the drill steel against rotation relative thereto and is coupled to the sleeve generally by means of longitudinally extending interengaging jaws. The nut is internally splined to fit over the correspondingly splined stem of the piston for rotation therewith. To prevent scoring between the chuck nut and piston, the nut is generally made of bronze or other non-ferrous material having good bearing qualities. The driving connection between the bushing or chuck nut and its sleeve in rotation transmitting relation therewith, has heretofore been the source of serious difficulties. In some instances the bushing was coupled to the chuck sleeve by interengaging jaws similar to the jaws between the chuck sleeve and driver, but because the bushing is made of softer material, its jaws would soon wear off or break off and necessitate its replacement. It has also been tried to simply screw the bushing within the sleeve, and while this screw threaded connection overcame the difficulties encountered with the interengaging jaws, it made the removal of the bushing from its sleeve very difficult.

It is therefore the primary object of this invention to provide an improved method of forming a rigid connection between a sleeve and a bushing, which is simple to manufacture and which provides an adequate connection for transmitting rotation to such element as the drill steel of a rock drill, without subjecting the bushing to premature wear or breakage and enabling removal of the bushing from the sleeve without difficulty.

Another object of this invention is to provide a simple and efficient method of securing a non-ferrous bushing within a steel sleeve against rotation relative thereto.

Other objects and advantages more or less ancillary to the foregoing and the manner in which all the various objects are attained will appear in the following description, which considered in connection with the accompanying drawing, sets forth the preferred embodiment of the invention.

In the drawing,

Figure 1 is a longitudinal sectional view of a rock drill assembly embodying the invention.

Figure 2 is a perspective view of the chuck nut or bushing and chuck sleeve finally machined for assembly. In this view the chuck sleeve is shown with one end broken away.

Figure 3 is an enlarged end view of the chuck nut looking in the direction of the arrows 3—3 in Figure 2.

Figure 4 is an enlarged end view of the chuck sleeve looking in the direction of the arrows 4—4 in Figure 2.

Figure 5 is a fractional enlarged end view, corresponding to Figures 3 and 4, of the chuck nut and chuck sleeve after assembly.

The rock drill assembly shown in Figure 1 includes a cylinder housing 10 having reciprocably mounted therein a piston 12 formed with a stem 14. This stem is slidably guided within a spacer or front bushing 16 which is preferably pressed or closely fitted within the front end of the cylinder 10 and is provided with an external shoulder 18 butting against the front end of the cylinder 10.

Mounted within the other end of the cylinder 10, there is a valve mechanism 20 operable for effecting alternative admission of the motive fluid into the ends of the cylinder and the consequential reciprocation of the piston 12. The cylinder is closed at that end by a bearing plate 22 and a back head 24, within which is rotatably mounted a motive fluid controlling throttle valve 26. Between the valve mechanism 20 and bearing plate 22 there is mounted a rotation mechanism 28 including a rifle bar 30 which extends into the piston 12 in operative engagement with a rifle nut 32 screwed within the piston.

All the parts and mechanisms above mentioned are of conventional design generally found in rock drills of this type, and since these parts and mechanisms form no part of this invention, no further description of them is thought necessary, other than pointing out that through the rotation mechanism 28, rotation in one direction is imparted to the piston 12 and its integral stem 14 and transmitted therefrom to the cutting tool or drill steel in the manner hereinafter set forth.

Bolted or otherwise rigidly secured to the cylinder 10, there is a front housing 34 within which is rotatably mounted a chuck sleeve 36. This sleeve has a pilot or inner end portion 38 journalled within the stationary front bushing 18 and is prevented from moving longitudinally by an external shoulder 40 located between the outer end of the front bushing 18 and a front housing internal shoulder 42.

Located within the outer end of the front housing 34, there is the usual chuck driver 44 which has its inner end face drivingly connected with the outer end face of the sleeve 36 for rotation therewith by means of the usual longitudinally extending interengaging jaws (not shown). Internally, the chuck driver 44 is appropriately machined to operatively receive the driving lugs 46 of a cutting tool or drill steel 48, through which rotation of the sleeve 36 transmitted to the chuck driver 44 is in turn imparted to the drill steel. The drill steel 48 is also provided with a shank 50 which extends from the lugs inwardly into the sleeve 36 to receive the impacts of the piston 12.

Referring now more particularly to the invention, the inner end portion 38 of the sleeve 36 is formed with two concentric counterbores 52 and 54, the counterbore 52 having a smooth wall of accurate diameter throughout to form an effective bearing, while the counterbore 54 is somewhat larger than the other to form at its junction therewith a flat ledge or shoulder 56. The entire wall of the counterbore 54 is accurately machined to provide thereon small longitudinally extending parallel serrations or teeth 58 having a depth of about twenty-thousandths of an inch with the bottom of the teeth preferably rounded or arcuated as at 60 to prevent fracture which might otherwise originate therefrom and progressively extend through the wall of the sleeve. From the rounded bottom, the sides of the teeth extend inwardly at about right angles from each other to form a sharp pointed crown 62.

Mounted in the two sleeve counterbores 52 and 54, in the manner hereinafter explained, there is a chuck bushing 64 formed with internal splines 66 corresponding to the external splines of the piston stem 14 and engaging therewith for transmitting rotation of the piston to the sleeve 36. This chuck bushing is preferably made of bronze or other nonferrous material having good bearing qualities, and externally is formed of two smooth cylindrical portions 68 and 70, the latter forming a pilot of a length and diameter substantially equal to that of the sleeve counterbore 52. The other portion or head 68, is shorter than the portion 70 but about equal in length to the length of the sleeve counterbore 54. In diameter, the head 68 is about equal or preferably somewhat smaller than the root diameter of the teeth 58 formed within the sleeve counterbore 54.

Keeping in mind that the sleeve 36 is preferably made of high grade heat tested steel and that the chuck bushing 64 is made of softer material such as bronze, the assembly of the two parts is effected by simply inserting, with the help of a press or other suitable machine, the bushing 64 into the inner end of the sleeve 36. During this operation, the bushing pilot portion 70 will first enter the smooth counterbore or bearing 52 of the sleeve, thereby assuring proper alignment of the bushing with the sleeve. When the bushing portion or head 68 contacts the inner end of the sleeve, additional pressure may be applied on the bushing to drive it further into the sleeve until the end of the bushing head 68 adjacent the pilot 70 contacts the flat shoulder 56 of the sleeve. During this last step of the assembling operation, the sharp teeth 58 provided in the counterbore 54 of the sleeve 36 will act as broach teeth cutting their way into the wall of the bushing head 68, and thereby providing the bushing head 68 with serration or teeth corresponding exactly to and in perfect engagement with the teeth 58 of the sleeve 36 for preventing any possible rotation of the bushing relative to the sleeve.

If it becomes necessary to remove the bushing from the sleeve, the former can simply be pressed out of the latter by exacting pressure on the pilot end of the bushing.

In practice, the driving connection above described between the chuck bushing 64 and chuck sleeve 36, hereinafter referred to as a serrated connection or joint between the two parts, has been found very satisfactory. With this connection, since the depth of the teeth 58 is relatively small, the sleeve and bushing can be made of a diameter smaller than heretofore possible with the conventional jaw or screw threaded connection.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as hereinafter claimed.

I claim:

1. The method of making a rigid connection between a steel sleeve and a bronze bushing which consists of providing the sleeve with a smooth internal bearing of exact diameter and a concentric counterbore shorter than the bearing, providing longitudinally extending serrations in the wall of said counterbore, providing the bushing with a smooth pilot of a length and diameter substantially equal to that of said bearing and with a head of a diameter substantially equal to the root diameter of said serrations, inserting said pilot into said bearing until said head reaches the outer end of said counterbore, and pressing said head into said counterbore until it reaches the bottom thereof to cause said serrations to cut corresponding serrations on said head.

2. The method of making a rigid connection between a steel sleeve and a non-ferrous bushing which consists of providing the sleeve with a smooth internal bearing of exact diameter and a concentric counterbore shorter than said bearing, providing substantially V-shaped parallel serrations having a rounded bottom in the wall of said counterbore extending longitudinally the full length thereof, said serrations having a depth of about twenty-thousandths of an inch, providing the bushing with a smooth pilot of a diameter substantially equal to that of said bearing and with a head of a diameter substantially equal to the root diameter of said serrations, inserting said pilot into said bearing until said head reaches the outer end of said counterbore, and causing said serrations to cut corresponding serrations on said head by pressing said head into said counterbore until it reaches the bottom thereof.

SAMUEL D. GUNNING.

References Cited in the file of this patent

UNITED STATES PATENTS

| Number | Name | Date |
|---|---|---|
| 1,129,989 | Kelsey | Mar. 2, 1915 |
| 1,157,666 | Bennett | Oct. 26, 1915 |
| 1,776,615 | Boothman et al. | Sept. 23, 1930 |
| 1,968,376 | Curtis | July 31, 1934 |
| 2,112,673 | Lewis | Mar. 29, 1938 |
| 2,209,181 | Wendel | July 23, 1940 |
| 2,337,351 | Schorer | Dec. 21, 1943 |
| 2,446,515 | Weingart | Aug. 3, 1948 |